United States Patent
Ramineni et al.

(10) Patent No.: US 8,874,801 B1
(45) Date of Patent: Oct. 28, 2014

(54) ON CHIP PERFORMANCE TRACKING FOR A SYSTEM ON A CHIP

(71) Applicant: Xilinx, Inc., San Jose, CA (US)

(72) Inventors: Nagalatha Ramineni, Hyderabad (IN); Sesibhushana Rao Bommana, Hyderabad (IN)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 13/791,642

(22) Filed: Mar. 8, 2013

(51) Int. Cl.
G06F 13/38 (2006.01)
G06F 13/20 (2006.01)

(52) U.S. Cl.
CPC ................................. *G06F 13/20* (2013.01)
USPC .............................................. 710/15; 710/72

(58) Field of Classification Search
None
See application file for complete search history.

(56) References Cited

U.S. PATENT DOCUMENTS 5,426,741 A * 6/1995 Butts et al. .................... 710/18
6,804,631 B2 * 10/2004 Kelley et al. ................ 702/187

OTHER PUBLICATIONS

JTAG101, JTAG 101 IEEE 1149.x and Software Debug, 2009, pp. 1-26.*
Kyung et al., "Performance Monitor Unit Design for an AXI-based Multi-Core SoC Platform", SAC'07, Mar. 11-15, 2007, p. 1565-1572, Seoul, Korea.
LogiCORE IP AXI Performance Monitor v3.00a, Product Guide, PG037, Dec. 18, 2012, pp. 1-81, Xilinx, Inc., 2100 Logic Drive, San Jose, CA US.
U.S. Appl. No. 13/398,790, filed Feb. 16, 2012, Schumacher et al.
U.S. Appl. No. 13/676,035, filed Nov. 13, 2012, Schumacher et al.

* cited by examiner

Primary Examiner — Cheng-Yuan Tseng
(74) Attorney, Agent, or Firm — Kevin T. Cuenot

(57) ABSTRACT

An integrated circuit includes a bus (905), processor coupled to the bus (910), a peripheral coupled to the bus (930), and a performance tracking module (215) configured to detect bus events and non-bus related events. The performance tracking module is configured to determine a bus performance metric from the bus events and a non-bus performance metric from the non-bus related events.

17 Claims, 7 Drawing Sheets

500

| Width | Name | Description |
|---|---|---|
| 32 | SW sync data | Software sync data through the control register |
| 16 | Time Stamp Difference | Time stamp difference between the previous event and the current event |
| 1 | Loop Event | Is a "1" when the time stamp difference exceeds 2^16 |
| 3 | Non-bus related Event 0 Flags | Non-bus related event 0 start, stop, and event flags |
| 7 | Agent 0 Flags | Event flags for agent 0 |
| Width | Agent 0 Log Data | AWID, BID, ARID, RID, AWLEN, ARLEN |
| 3 | Non-bus related Event 1 Flags | Non-bus related event 1 start, stop, and event flags |
| 2 | Agent 1 Flags | Event flags for agent 1 |
| Sum of widths of TID, TDEST, and TUSER | Agent 1 Log Data | TID, TDEST, TUSER |

FIG. 5

ON CHIP PERFORMANCE TRACKING FOR A SYSTEM ON A CHIP

FIELD OF THE INVENTION

This specification relates to integrated circuits (ICs) and, more particularly, to determining the performance of a System-On-A-Chip type of IC.

BACKGROUND

A System-On-A-Chip (SOC) is a type of integrated circuit (IC) that includes a microprocessor operating in cooperation with other circuitry. Typically, the microprocessor executes program code and interacts with one or more function-specific circuits, e.g., that do not execute program code. In some cases, the SOC is formed of two or more dies within a single IC package. In other cases, the microprocessor and other circuitry are implemented on a single die. One example of an SOC includes a microprocessor and programmable circuitry. The programmable circuitry can be implemented using a field programmable gate array (FPGA) architecture.

An FPGA typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth. Each programmable tile includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that can include, for example, function generators, registers, arithmetic logic, and so forth.

The programmable interconnect circuitry and programmable logic circuitry each is typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA. The functionality of an FPGA, or an FPGA portion of an SOC, is controlled by data bits provided to the IC for that purpose. The data bits, often referred to as a "bitstream," "configuration bitstream," or "configuration data," can be stored in volatile memory (e.g., static memory cells, as in FPGAs and some CPLDs), in non-volatile memory (e.g., FLASH memory, as in some CPLDs), or in any other type of memory cell.

When an electronic system is implemented as a combination of individual components mounted on a circuit board, test personnel are able to probe many of the traces between the individual components. As such, various operational parameters can be measured and tested. The high level of integration found within modern SOCs, however, makes this type of measurement and testing ineffective. Often, an SOC design is so complex that complete performance validation at design time is nearly impossible. Performance of the SOC design must also be measured at runtime.

SUMMARY

An integrated circuit includes a bus, a processor coupled to the bus, a peripheral coupled to the bus, and a performance tracking module configured to detect bus events and non-bus related events. The performance tracking module is configured to determine a bus performance metric from the bus events and a non-bus performance metric from the non-bus related events.

A performance tracking module includes a plurality of control registers and an event logger coupled to the control registers. The event logger is configured to detect a selected bus event from a bus and a selected non-bus related event from a circuit not connected to the bus according to the control registers. The performance tracking module further can include an event counter coupled to the control registers. The event counter is configured to count occurrences of the selected bus event and the selected non-bus related event according to the control registers.

A method of performance tracking for a system-on-a-chip includes detecting non-bus related events from a circuit implemented within an integrated circuit and detecting bus events from a bus coupling a processor and a peripheral both implemented within the integrated circuit. The method further includes calculating a first non-bus performance metric from the non-bus related events and calculating a first bus performance metric from the detected bus events.

BRIEF DESCRIPTION OF THE DRAWINGS

FIG. 5 is a table illustrating exemplary performance data captured by the event logger of FIG. 4.

DETAILED DESCRIPTION OF THE DRAWINGS

While the specification concludes with claims defining novel features, it is believed that the various features disclosed within this specification will be better understood from a consideration of the description in conjunction with the drawings. The process(es), machine(s), manufacture(s) and any variations thereof described within this specification are provided for purposes of illustration. Specific structural and functional details disclosed within this specification are not to be interpreted as limiting, but merely as a basis for the claims and as a representative basis for teaching one skilled in the art to variously employ the features described in virtually any appropriately detailed structure. Further, the terms and phrases used within this specification are not intended to be limiting, but rather to provide an understandable description of the features described.

This specification relates to integrated circuits (ICs) and, more particularly, to determining performance of a System- On-A-Chip (SOC). In accordance with the inventive arrangements disclosed within this specification, a performance tracking module is implemented on the SOC that is being evaluated. The performance tracking module is configurable to detect events occurring on a bus utilized by the various components of the SOC. From the bus events, one or more bus performance metrics can be calculated.

The performance tracking module also is configurable to detect various non-bus related events. The performance tracking module can calculate one or more non-bus performance metrics based upon the detected non-bus related events. In one aspect, the performance tracking module is able to implement cross-probing functionality. Cross-probing functionality refers to the triggering of a monitor function in one domain responsive to a detection of a state or condition in another domain. For example, cross-probing refers to monitoring bus events responsive to detection of one or more particular non-bus related events and/or monitoring non-bus related events responsive to detection of one or more particular bus related events. In another example, cross-probing can trigger event logging responsive to one or more event counters reaching a user-defined threshold value or values.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
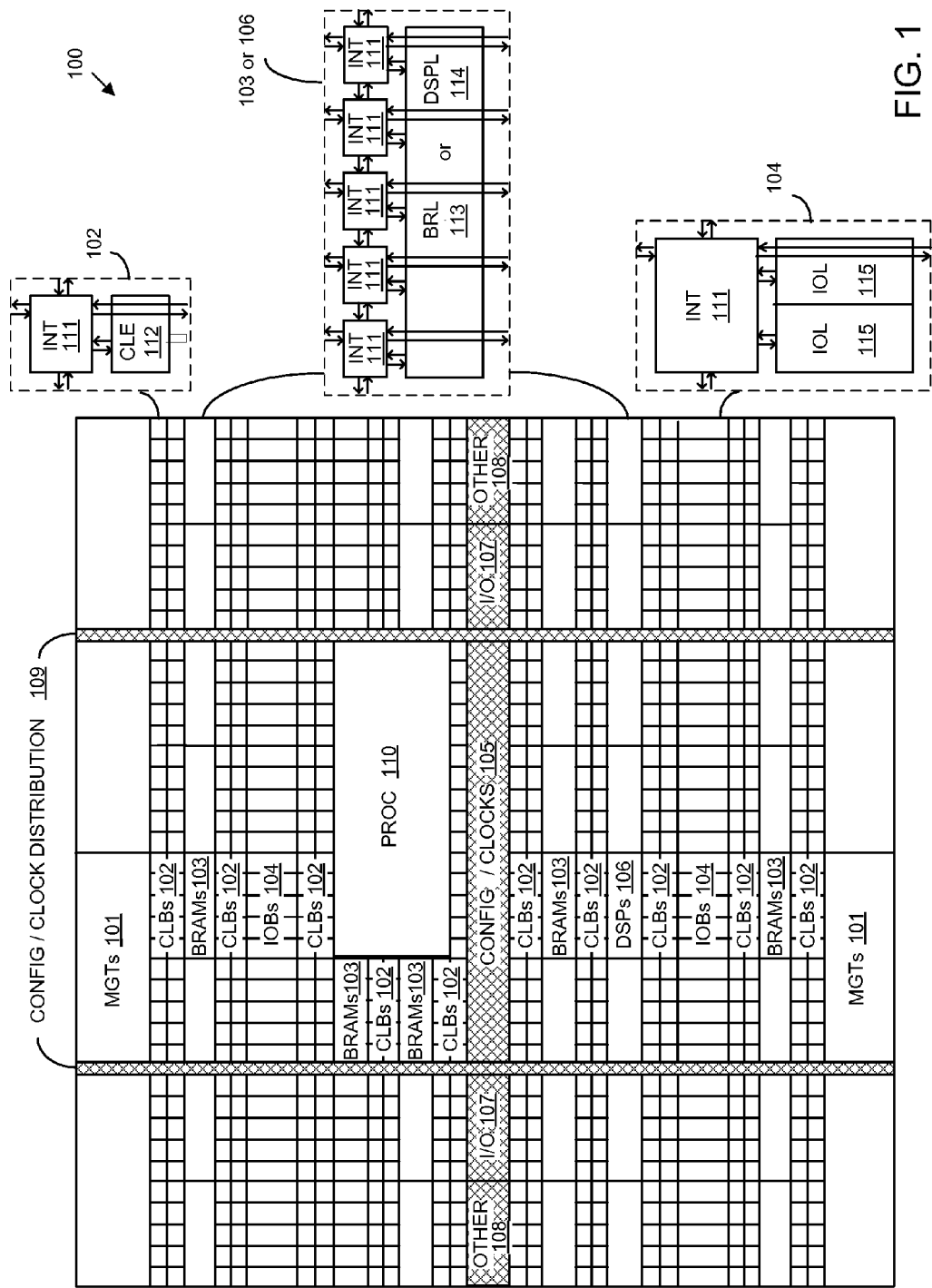
FIG. 1 is a block diagram illustrating an exemplary architecture for an integrated circuit.

FIG. 1 is a block diagram illustrating an exemplary architecture 100 for an IC in accordance with an embodiment disclosed within this specification. Architecture 100 is one example of an SOC architecture. Architecture 100 can be implemented to include field programmable gate array (FPGA) type of circuitry. As shown, architecture 100 includes several different types of programmable circuit blocks. In some cases, circuit blocks are referred to as "logic blocks." For example, architecture 100 can include a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized I/O blocks 107 (e.g., configuration ports and clock ports), and other programmable logic 108 such as digital clock managers, analog-to-digital converters, system monitoring logic, and so forth.

In some ICs, each programmable tile includes a programmable interconnect element (INT) 111 having standardized connections to and from a corresponding INT 111 in each adjacent tile. Therefore, the INTs 111, taken together, implement the programmable interconnect structure for the illustrated IC. Each INT 111 also includes the connections to and from the programmable logic element within the same tile, as shown by the examples included at the top of FIG. 1.

For example, a CLB 102 can include a configurable logic element (CLE) 112 that can be programmed to implement user logic plus a single INT 111. A BRAM 103 can include a BRAM logic element (BRL) 113 in addition to one or more INTs 111. Typically, the number of INTs 111 included in a tile depends on the height of the tile. In the pictured embodiment, a BRAM tile has the same height as five CLBs, but other numbers (e.g., four) can also be used. A DSP tile 106 can include a DSP logic element (DSPL) 114 in addition to an appropriate number of INTs 111. An IOB 104, for example, can include two instances of an I/O logic element (IOL) 115 in addition to one instance of an INT 111. As will be clear to those of skill in the art, the actual I/O pads connected to IOL 115 typically are not confined to the area of IOL 115.

In the example pictured in FIG. 1, a columnar area near the center of the die, e.g., formed of regions 105, 107, and 108, can be used for configuration, clock, and other control logic. Horizontal areas 109 extending from this column are used to distribute the clocks and configuration signals across the breadth of the programmable IC.

Some ICs utilizing the architecture illustrated in FIG. 1 include additional logic blocks that disrupt the regular columnar structure making up a large part of the IC. The additional logic blocks can be programmable blocks and/or dedicated circuitry. For example, a processor block depicted as PROC 110 spans several columns of CLBs and BRAMs.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, memory controllers, direct memory access (DMA) modules, or the like.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 103 and BRAMs 103 can be considered programmable circuitry of the IC.

In general, the functionality of programmable circuitry is not established until configuration data is loaded into the IC. A set of configuration bits can be used to program programmable circuitry of an IC such as an FPGA. The configuration bit(s) typically are referred to as a "configuration bitstream" or "bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks. Thus, loading a configuration bitstream into the IC dictates functionality of programmable circuit blocks and establishes internal connections among the various circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. In some cases, operational modes can be changed during operation of the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 1 are purely exemplary. In an actual IC, for example, more than one adjacent column of CLBs is typically included wherever the CLBs appear, to facilitate the efficient implementation of a user circuit design. The number of adjacent CLB columns, however, can vary with the overall size of the IC. Further, the size and/or positioning of blocks such as PROC 110 within the IC are for purposes of illustration only and are not intended as a limitation of the one or more embodiments disclosed within this specification.

In one aspect, PROC 110 and, more particularly, various elements within PROC 110 such as one or more cores, DMA modules, memory controllers, interfaces, and the like can communicate over a bus. For example, the bus can be implemented as an Advanced Microcontroller Bus Architecture (AMBA) compliant and an Advanced eXtensible Interface compliant bus (hereafter "AXI"). In that case, the various components described can communicate over a bus that conforms with the AMBA AXI Protocol Specification v. 3.0, which is incorporated herein by reference in its entirety, or other suitable version of the specification. AXI is a high performance, high frequency interface that is suitable for submicron interconnects. User circuits implemented within the programmable circuitry and/or other cores also can connect using AXI.

Figure 2:
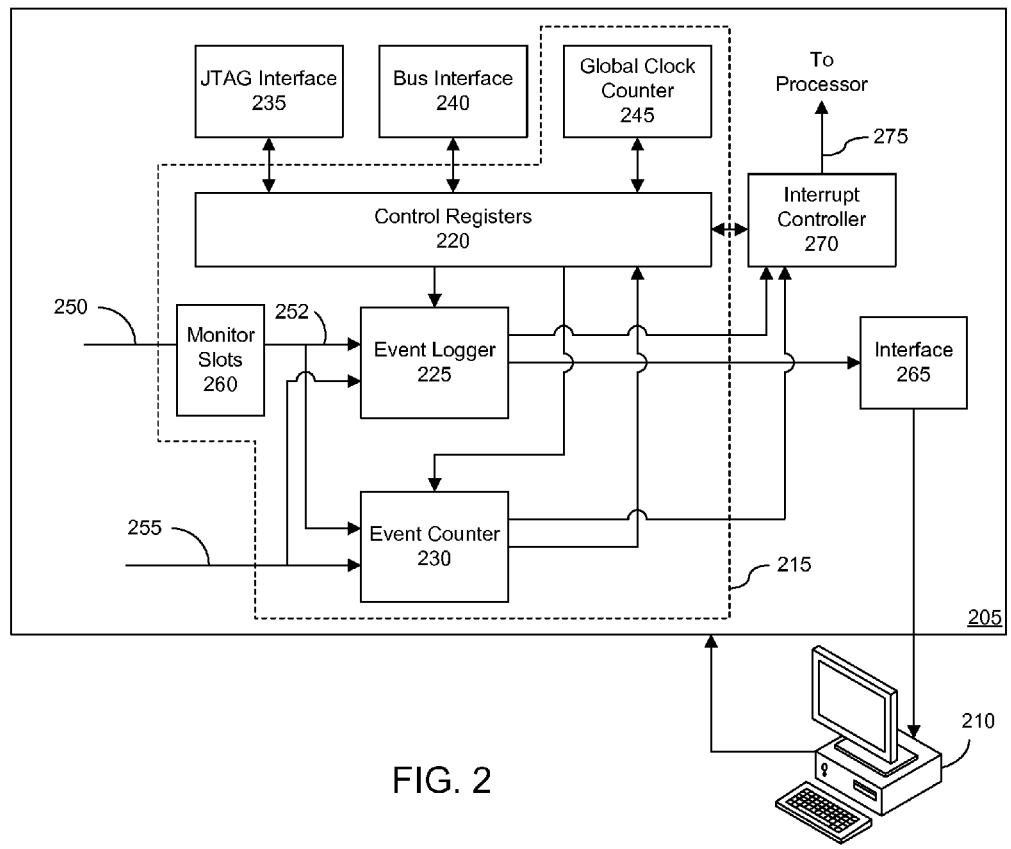
FIG. 2 is an example of a test and evaluation system.

FIG. 2 is an example of a test and evaluation system (system) 200. System 200 includes an SOC 205 communicatively linked with a data processing system 210. SOC 205 includes a processor (not shown) that executes program code. The processor is configured to communicate with one or more peripherals over a bus. In one example, SOC 205 is implemented using the architecture described with reference to FIG. 1 or a variant thereof. Accordingly, the bus used by the SOC can be implemented as an AXI compliant bus.

SOC 205 includes a performance tracking module 215. Performance tracking module 215 includes control registers 220, an event logger 225, and an event counter 230. Further, performance tracking module 215 can include monitor slots 260 and global clock counter 245. In one example, performance tracking module 215 is implemented using programmable circuitry of SOC 205. Performance tracking module 215, for example, can be made available as a core in any of a variety of different formats, e.g., as a netlist, as hardware description language file(s), as a configuration bitstream, or the like.

Control registers 220 are implemented as a plurality of registers, e.g., memories. Control registers 220 store control data for performance tracking module 215. When storing control data, configuration registers 220 control operation of event logger 225 and event counter 230. As shown, control registers 220 are coupled to a Joint Test Action Group (JTAG) interface 235, a bus interface 240, and global clock counter 245.

In one aspect, control data is provided from data processing system 210 to SOC 205. The control data can be sent via a communication link between data processing system 210 and SOC 205, which connects to JTAG interface 235. JTAG interface 235 is configured to write the received control data to control registers 220. As such, a user utilizing data processing system 210 is able to control operation of performance tracking module 215. In another aspect, control data is provided from bus interface 240. Control data can be received by the processor of the SOC or generated by the processor of the SOC and written to control registers 220 via bus interface 240. Control data further can be generated by any other circuit, e.g., a user specified circuit implemented in programmable circuitry, that has access to bus interface 240.

Global clock counter 245 is coupled to control registers 220. In one aspect, global clock counter 245 has a configurable width. Global clock counter 245 can be implemented as a free-running counter that can be utilized to measure simulation and/or run time of an application. Global counter 245 can be set and reset via control registers 220. In one aspect, global clock counter 245 can be used to measure the run time of an application executed by the processor, e.g., processor 210. Further, cross probing can be implemented in that when global clock counter 245 reaches a particular value, monitoring of bus signals and/or non-bus related signals causing the generation and storage of performance data can be started. This functionality can be controlled via the control registers 220.

Signal 250 conveys bus signals from the bus of the SOC. Within this specification, the same reference characters are used to refer to terminals, signal lines, wires, and their corresponding signals. In this regard, the terms "signal," "wire," "connection," "terminal," and "pin" may be used interchangeably, from time-to-time, within this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

Within this specification, a signal occurring on the bus is referred to as a "bus signal." A "bus event" is a predetermined state or condition observed or detected in one or more bus signals. Each master or slave communicating on the bus does so through a bus interface, also referred to as an "agent." In one aspect, when using performance tracking module 215, one or more of the agents are selected and coupled to performance tracking module 215. More particularly, each selected agent is connected to one of a plurality of available monitor slots 260. As such, any bus signals received from the bus or provided to the bus via an agent connected to performance tracking module 215 can be provided to monitor slots 260.

Each of monitor slots 260 is an interface configured to receive bus signals from the particular agent connected thereto. In one aspect, performance tracking system 215 includes a configurable number of monitor slots, e.g., from one to eight. Each monitor slot further is configurable to connect to a streaming agent (e.g., an AXI4 streaming agent) or a memory mapped agent (e.g., an AXI4 memory mapped agent). Both types of agents can be used with performance tracking module 215 concurrently. In another aspect, each slot of monitor slots 260 is selectively configurable to include a first-in-first-out (FIFO) memory with separate read and write ports to effectuate clock domain crossing. The output of monitor slots 260, illustrated as signal 252, is connected to each of event logger 225 and event counter 230.

Signal 255 conveys one or more signals from circuitry, e.g., user circuitry, not connected to the bus of SOC 205. Signal 255 is referred to as a non-bus related signal or signals as the case may be. For example, one or more user-specified circuits implemented using the programmable circuitry of SOC 205 can be connected to event logger 225 and event counter 230. As such, performance tracking module 215 can receive various non-bus related signals and detect non-bus related events in addition to bus events. A non-bus related event is a predetermined condition or state observed or detected for one or more non-bus related signals.

In general, event logger 225 logs bus events of interest received via monitor slots 260 as well as non-bus related events detected from signal 255. In one aspect, event logger 225 outputs detected events to interface 265. The term "event" or "events" is intended to refer to either bus events, non-bus related events, or both. Interface 265 can be implemented as a high speed interface that is coupled to data processing system 210. As such, data collected by event logger 225 can be output in real time, periodically, or from time-to-time to data processing system 210 for further analysis. As used herein, the phrase "real time" means a level of processing responsiveness that a user or system senses as sufficiently immediate for a particular process or determination to be made, or that enables a processing device (e.g., performance tracking module 215 in this example) to keep up with some external process.

In general, event counter 230 is configured to count bus events detected from signal 252 and/or non-bus related events detected from signal 255. Accordingly, event counter 230 includes one or more counters that can be set and read via software, e.g., via data processing system 210 using JTAG interface 235 or the processor located "on-chip" as part of the SOC being monitored using bus interface 240.

Each of event logger 225 and event counter 230 is coupled to interrupt controller 270. Responsive to one or more predetermined conditions, e.g., detection of particular events, performance metrics, a memory filling to a particular state, etc., event logger 225 and/or event counter 230 can signal interrupt controller 270 to generate an interrupt via signal 275 to the processor of the SOC. The processor then, under software control, can perform any of a variety of operations such as communicating with data processing system 210, programming new and/or updated (e.g., different) control data into control registers 220 by way of bus interface 240, or the like. It should be appreciated that in communicating with data processing system 210, the processor can request updated control data which data processing system 210 can provide via JTAG interface 235.

Figure 3:
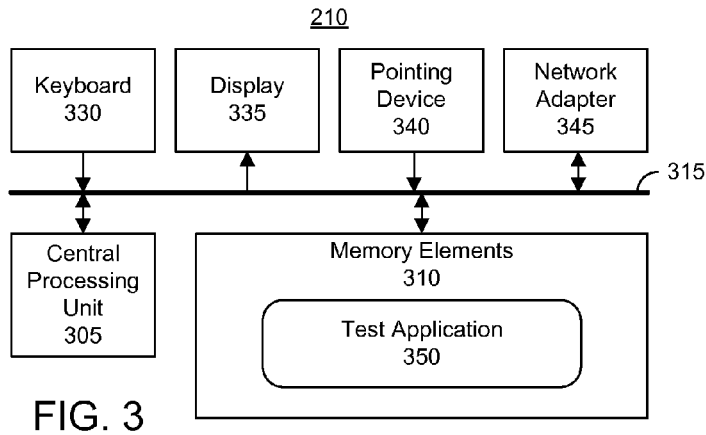
FIG. 3 is a block diagram illustrating an exemplary implementation of the data processing system of FIG. 2.

FIG. 3 is a block diagram illustrating an exemplary implementation of data processing system (system) 210 of FIG. 2. System 210 includes at least one central processing unit (CPU) or processor 305 coupled to memory elements 310 through a system bus 315 or other suitable circuitry. System 210 can store program code within memory elements 310. CPU 305 executes the program code accessed from memory elements 310 via system bus 315. In one aspect, system 210 is implemented as a computer that is suitable for storing and/or executing program code. It should be appreciated, however, that system 210 can be implemented in the form of any system including a processor and memory that is capable of performing the functions described within this specification. For purposes of clarity, the processing unit located within data processing system 210 that executes program code is referred to as a CPU within this specification. The term "processor" refers to the processing unit that executes program code within the SOC.

Memory elements 310 include one or more physical memory devices such as, for example, local memory and one or more bulk storage devices. Local memory refers to random access memory or other non-persistent memory device(s) generally used during actual execution of the program code. Examples of a bulk storage device include a hard disk drive (HDD), a solid state drive (SSD), or other persistent data storage device. System 210 also can include one or more cache memories (not shown) that provide temporary storage of at least some program code in order to reduce the number of times program code must be retrieved from any bulk storage device included in memory elements 310 during execution.

Input/output (I/O) devices such as a keyboard 330, a display 335, and a pointing device 340 optionally can be coupled to system 210. The I/O devices can be coupled to system 210 either directly or through intervening I/O controllers. A network adapter 345 also can be coupled to system 210 to enable system 210 to become coupled to other systems, computer systems, remote printers, and/or remote storage devices through intervening private or public networks. Modems, cable modems, Ethernet cards, and wireless transceivers are examples of different types of network adapter 345 that can be used with system 210.

As pictured in FIG. 3, memory elements 310 can store a test application 350. Test application 350, being implemented in the form of executable program code, is executed by system 210. As such, test application 350 is considered part of system 210. Test application 350, in general, operates upon a received performance data collected and/or calculated by performance monitoring module 215 of FIG. 2. Further, test application 350 provides instructions necessary for system 210 to configure SOC 205 and to provide control data to performance tracking module 215. Test application 350 and any performance data operated upon by data processing system 210 in executing test application 350 are functional data structures that impart functionality when employed as part of system 210.

Figure 4:
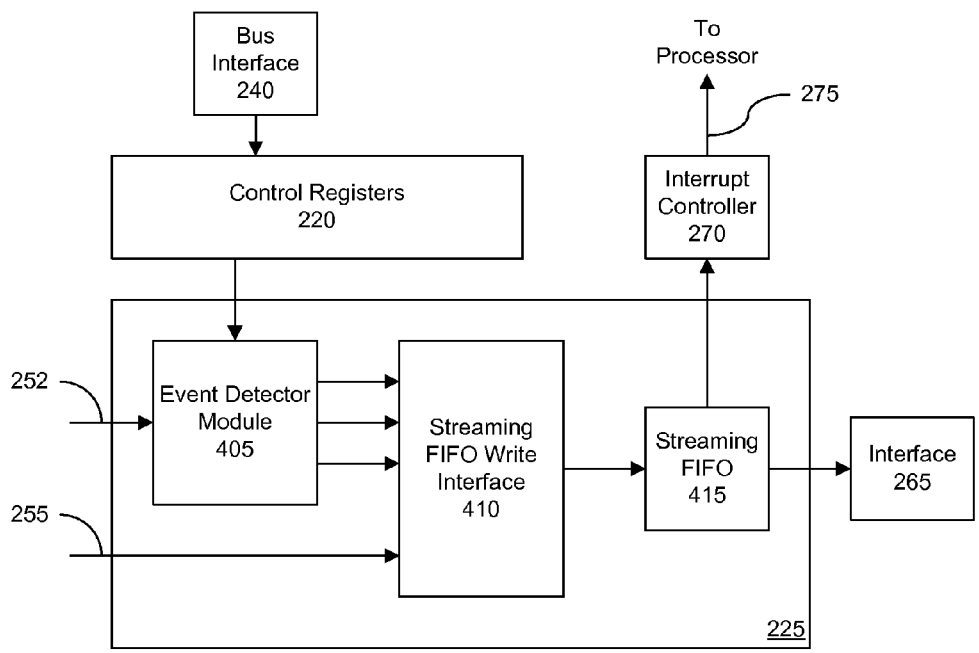
FIG. 4 is a block diagram illustrating an exemplary implementation of the event logger described with reference to FIG. 2.

FIG. 4 is a block diagram illustrating an exemplary implementation of event logger 225 of FIG. 2. As shown, event logger 225 includes an event detector module 405, a streaming FIFO write interface 410, and a streaming FIFO 415.

Event detector module 405 includes a plurality of event detectors. Each event detector is configurable to detect a particular type of bus event that is selected by control registers 220 and the control data stored therein. One or more bus events can be detected for each of the slots of monitor slots 260. For each slot, responsive to detecting a bus event specified by control registers 220, event detector module 405 is configured to generate and output at least a portion of performance data. The performance data, as output by event detector module 405, includes, but is not limited to, flags, log data, and non-bus related events. The performance data, in part, is provided to streaming FIFO write interface 410.

In the case of a memory map agent, event detectors generate flags including, but not limited to, a write address latch flag, a first write flag, a last write flag, a response flag, a read address latch flag, a first read flag, and a last read flag. Exemplary items of log data include, but are not limited to, a write address identifier generated by a master (AWID), an identification tag for the write response (BID), a read address identifier which is the identification tag for the read address group of signals (ARID), a read identifier tag which is the identifier tag of the read data group of signals generated by a slave (RID), a number of data transfers occurring in each write burse (AWLEN), and a number of data transfers occurring in each read burst (ARLEN).

In the case of a streaming agent, event detectors generate exemplary flags including, but not limited to, a first write flag and a last write flag. Exemplary items of log data generated by a detector for a streaming agent include, but are not limited to, a streaming identifier (TID), a destination identifier (TDEST), and TUSER in reference to side-band signals of the bus.

As shown, non-bus related events are provided to streaming FIFO write interface 410. Streaming FIFO write interface 410 writes the flags, log data, and non-bus related events to streaming FIFO 415. Streaming FIFO 415 is configured to output collected performance data to interface 265. In addition, streaming FIFO 415 is coupled to interrupt controller 270. In one aspect, streaming FIFO 415 can signal interrupt controller 270 to generate an interrupt on signal 275 to the processor under any of a variety of different conditions. For example, when streaming FIFO 415 stores a predetermined amount of data as specified by control registers 220, is empty, or the like, streaming FIFO 415 can signal interrupt controller 270 to generate an interrupt. The processor, for example, can write different control data to control registers 220 to discontinue collection of one or more different items of performance data.

In another aspect, event detector module 405 is configured to detect a first event and a second event that immediately follows the first event. Rather than storing a time stamp for each event individually, event detector module 405 determines a time difference between the first event and the second event. Event detector module 405 sends the time difference to streaming FIFO write interface 410 for storage in lieu of the individual time stamps, which reduces the size of data generated and bandwidth needed to offload such data. The performance data can be reconstructed using the stored time differences.

FIG. 5 is a table 500 illustrating exemplary performance data captured by event logger 225. More particularly, table 500 illustrates an exemplary packet format for data generated by event logger 225. In the example illustrated, table 500 shows the packet format when the performance tracking module is connected to a streaming agent (agent 0) and a memory map agent (agent 1). Table 500 illustrates the performance data captured and/or calculated by event logger 225. The performance data can include data derived from bus events and non-bus related events (i.e., non-bus related events 0 and 1). The software sync data is data sent or provided by the processor that is inserted inside the data logging. The processor sends the sync data, which is inserted inside the performance data being logged. The software sync data then can be used by the data processing system, i.e., system 210, to synchronize or calibrate internally while processing the performance data.

Figure 6:
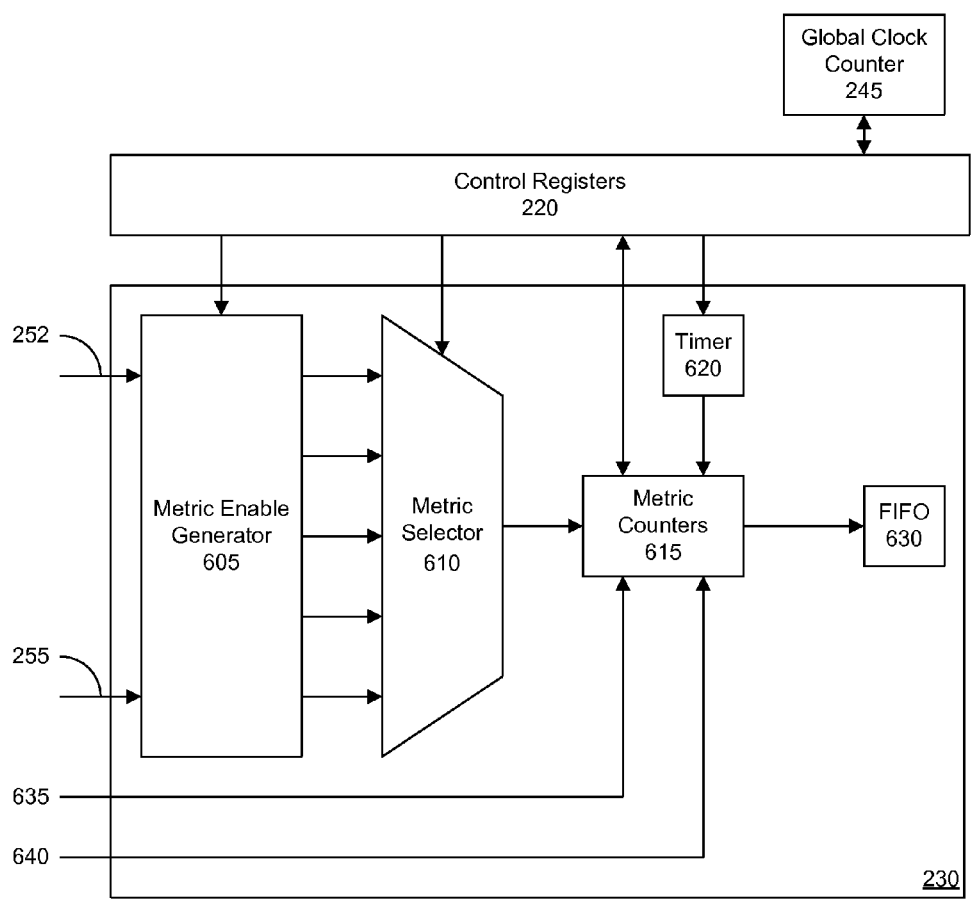
FIG. 6 is a block diagram illustrating an exemplary implementation of the event counter described with reference to FIG. 2.

FIG. 6 is a block diagram illustrating an exemplary implementation of event counter 230 of FIG. 2. As shown, event counter 230 includes a metric enable generator 605, a metric selector 610, a plurality of metric counters 615, a timer 620, and a FIFO 630. Metric enable generator 605 is programmed by control registers 220 to detect particular events and/or performance metrics from signal 252 and/or signal 255. A performance metric refers to either a detected event or a quantity that is dependent upon one or more detected events, whether bus events or non-bus related events.

Metric selector 610 passes only those performance metrics that are to be counted from metric enable generator 605 to metric counters 615 in accordance with control registers 220. Each performance metric that is generated requires one counter. As such, one counter is utilized within metric counters 615 for each performance metric that is to be calculated as specified by control registers 220. The various counter values of metric counters 615, e.g., performance metrics, form the performance data generated by event counter 230.

When evaluating signals from a memory map agent, event counter 230 can detect and/or calculate the non-exhaustive list of performance metrics shown below on a per agent basis.

Number of write requests
Number of read requests
Write latency distribution
Read latency distribution
Number of idle cycles caused by the slave during write transactions
Number of idle cycles caused by the master during read transactions
Total number of bytes/words written (as calculated using the write strobe (WSTRB), write valid (WVALID), and write ready (WREADY) signals)
Total number of bytes/words read (as calculated using the read ready (RREADY) and the read valid (RVALID) signals)
Number of write transactions
Number of read transactions
Average write latency
Average read latency
Total time for which there are no transactions happening on the bus (bus idle time)
Number of write transactions to a particular address range
Number of read transactions to a particular address range
Number of transactions to an unmapped address (i.e., where there is no slave at the transaction address) by each master (as determined by counting the decode error (DECERR) responses to each master)
Number of Write Responses
Number of write lasts (WLasts)
Number of read lasts (RLasts)
Details of the transaction with the highest write latency
Details of the transaction with highest read latency When evaluating signals from a streaming agent, event counter 230 can detect and/or calculate performance metrics such as a transfer count, a data byte count, a positional byte count, a null byte count, and an idle byte count on a per agent basis.

In one aspect, a threshold can be set for one or more of the counters within metric counter 615. The counter or counters for which thresholds are set can measure bus performance metrics or non-bus related performance metrics. Responsive to the counter reaching the threshold, as specified in control registers 220, monitoring and/or counting of one or more other events and/or performance metrics can be triggered. The performance metric(s) that can be monitored responsive to a counter reaching a threshold, or a combination of two or more counters reaching a threshold can be bus related, non-bus related, or both.

Metric counters 615 receive additional signals 635 and 640. In one aspect, signal 635 instructs metric counters 615 to start and/or stop. Assertion of signal 640 causes metric counters 615 to be reset. Signals 635 and 640 are received from any circuit located outside of, or external to, performance tracking module 215. For example, signal 635 can be generated by user circuits implemented within programmable circuitry that are not connected to the bus as previously described. In one aspect, responsive to a stop condition on signal 635, metric counters 615 stop counting and the counter values are stored within dedicated sample metric registers implemented within control registers 220. In one aspect, one of more of the metric counters 615 can be coupled to interrupt controller 270 to trigger an interrupt to the processor.

Timer 620 can be set to a time specified by control registers 220. When timer 620 expires, timer 620 generates a sample signal to metric counters 615. Responsive to the sample signal, metric counters 615 store the counter values maintained therein to the dedicated sample metric registers within control registers 220. In this regard, counter values can be sampled to control registers 220 under control of timer 620 or under control of one or more external circuits by way of signal 635. An external circuit is a circuit not included in the performance tracking module and not connected to the bus being monitored.

In one aspect, counter values specifying performance metrics can be stored within FIFO 630. In this regard, users have a choice whether to store performance metrics in control registers or FIFO 630, which can be an optional component. In any case, when included, FIFO 630, like control registers 220, can be read by the processor and provided to data processing system 210.

In another aspect, timer 620 can be connected to the interrupt controller to signal interrupt generation upon expiration of timer 620. In still another aspect, metric counters 615 can be connected to the interrupt controller thereby allowing one or more of the counters to trigger an interrupt upon reaching a predetermined value.

Figure 7:
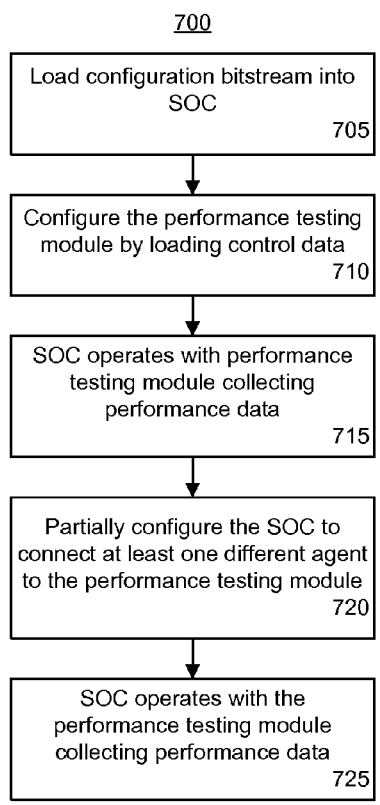
FIG. 7 is a flow chart illustrating an exemplary method of operation for the testing and evaluation system described with reference to FIG. 2.

FIG. 7 is a flow chart illustrating an exemplary method 700 of operation for a testing and evaluation system as described with reference to FIG. 2. Method 700 can begin in block 705 where the SOC is loaded with configuration data. The configuration data includes the performance tracking module. The initial configuration bitstream that is loaded into the SOC, for example, from the data processing system specifies which agents of the bus within the SOC are connected to the performance tracking module.

In block 710, once the SOC is configured, a user working through the data processing system can utilize the test application executing therein to configure the performance tracking module. The data processing system instructs the performance tracking module through the JTAG port of the SOC as to which metrics are to be calculated for the agents connected to the performance tracking module. In particular, through the JTAG port, the data processing system sends the control data that is loaded into the control registers of the performance tracking module.

In block 715, the SOC operates with the performance tracking module collecting performance data in accordance with the control data loaded into the control registers. The performance data that is collected can be stored and/or sent to the data processing system in real time or in near real time as described within this specification. As such, the user can view the performance data using the data processing system. In one aspect, one or more events and/or metrics can be displayed graphically. For example, for any agent individually, the metrics can be viewed graphically. In another example, the metrics for each of a plurality of agents can be viewed concurrently on a same graph, whether as waveforms, as bar graphs, or the like. Accordingly, the user can view a system perspective of the various events and/or performance data, including individual elements of performance data collected by the performance tracking module.

In block 720, the data processing system initiates a partial reconfiguration of the SOC. In particular, the data processing system sends a partial configuration bitstream to the SOC, which is loaded therein. Responsive to loading the partial configuration bitstream, the SOC implements the same circuit design as before, with the exception that one or more different agents are connected to the performance tracking module after loading the partial configuration bitstream than were connected to the performance tracking module prior to partial configuration.

In block 725, the SOC operates with the performance tracking module collecting performance data per the specified control data loaded through the JTAG port. It should be appreciated that the user can change the control data at any time while the SOC is configured and operating to detect different events and/or determine different performance metrics as desired. In order to connect different agents to the performance tracking module, however, either full configuration or partial configuration of the SOC is required.

Figure 8:
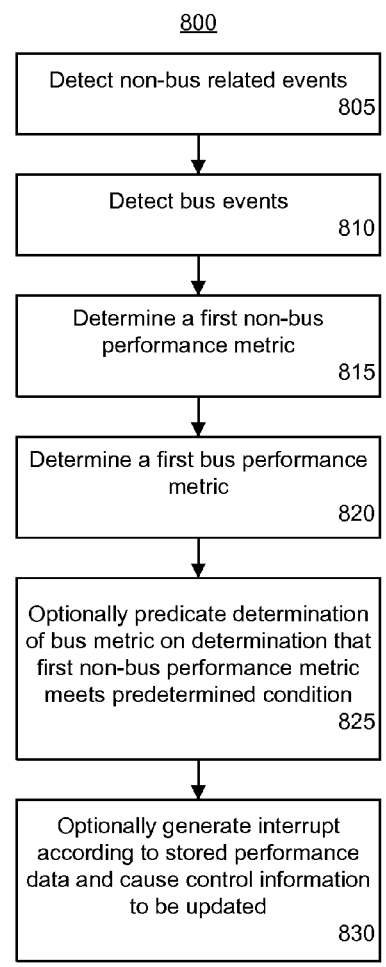
FIG. 8 is a flow chart illustrating an exemplary method of operation for the performance tracking module.

FIG. 8 is a flow chart illustrating an exemplary method 800 of operation for the performance tracking module. Method 800 begins in a state where the SOC has been configured and the performance tracking module also has been loaded with control data. Accordingly, in block 805, the performance tracking module detects non-bus related events. As discussed, the non-bus related events are detected from signals originating from circuits not connected to the bus that is being monitored. The signals from which the non-bus related events are determined are non-bus related signals.

In block 810, the performance tracking module detects one or more bus events. The bus events are detected from bus signals occurring on a bus that couples a processor with one or more peripherals within the SOC. In block 815, the performance tracking module determines a first non-bus performance metric. The first non-bus performance metric is determined from the detected non-bus related events. In block 820, the performance tracking monitor determines a first bus performance metric. The first bus performance metric is calculated from the bus events that are detected.

In block 825, the performance tracking module optionally predicates, or conditions, the determination of the bus performance metric(s) on whether the non-bus performance metric meets a predetermined condition. For example, responsive to determining that a selected non-bus performance metric exceeds a predetermined threshold, is less than a predetermined threshold, or is the same as a predetermined value, the performance tracking module can begin to monitor for, and detect, selected bus events and determine a bus performance metric from such detected bus events. Accordingly, the performance tracking module is able to initiate performance monitoring of the bus responsive to various external signals not affiliated with the bus within the SOC.

While block 825 illustrates that collection of performance data for the bus can be predicated upon a detecting particular conditions from the non-bus related events, the triggering of collection of performance data for non-bus signals also can be triggered by detecting a particular condition from the bus signals. For example, a bus performance metric can be calculated responsive to determining that a non-bus performance metric meets a predetermined condition. A non-bus performance metric can be calculated responsive to determining that a bus performance metric meets a predetermined condition. Further, as previously noted, collection of performance data from bus signals, collection of performance data from non-bus signal, or both can be started responsive to the global clock counter reaching a particular value.

In block 830, the performance tracking module optionally generates an interrupt according to stored performance data. The performance tracking module causes the control data within the control registers to be updated. In one aspect, the interrupt causes the processor within the SOC to write updated control data to the control registers. The updated control data specifies one or different events and/or performance metrics to be calculated whether for the bus or non-bus related.

In another aspect, the interrupt to the processor causes the processor of the SOC to notify the data processing system coupled to the SOC of the interrupt condition. In that case, updated control data can be provided to the performance tracking module responsive to the processor notification to the data processing system of the interrupt. Further, in another aspect, the data processing system can initiate a partial configuration of the SOC as described herein responsive to receiving a message from the processor in consequence of the interrupt.

Figure 9:
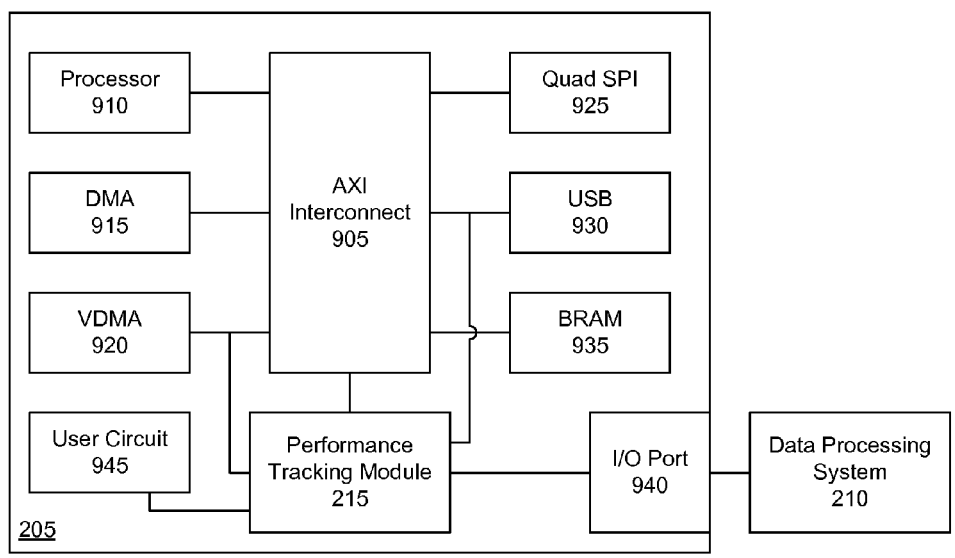
FIG. 9 is a block diagram illustrating an exemplary use case involving a performance tracking module within a System-On-A-Chip (SOC).

FIG. 9 is a block diagram illustrating an exemplary use case involving a performance tracking module within an SOC. As shown, SOC 205 includes performance tracking module 215 and an AXI interconnect 905. AXI interconnect 905 is connected to a processor 910, a DMA module 915, a video DMA (VDMA) module 920, a Quad Serial Peripheral Interface (SPI) 925, a Universal Serial Bus (USB) module 930, and a BRAM 935. Each entity connected to AXI interconnect 905 is connected by an agent. As shown, the agent for VDMA module 920 and USB module 930 is connected to performance tracking module 215. Accordingly, performance tracking module 215 receives bus events for VDMA module 920 and USB module 930.

Performance tracking module 215 is communicatively linked to data processing system 210 through I/O port 940. In one aspect, I/O port 940 is a JTAG interface through which performance tracking module 215 receives control data and outputs performance data. In another aspect, I/O port 940 is a high speed interface such as a USB 3.0 interface or the like through which performance data is sent to data processing system 210. Performance tracking module 215 further is connected to AXI interconnect 905. The connection between AXI interconnect 905 and performance tracking module 215 allows the processor to read various performance data stored within the control registers, write new and/or updated control data to the control registers, etc.

Within FIG. 9, a user circuit 945 has been implemented within the programmable circuitry. As shown, user circuit 945 provides one or more non-bus related signals to performance tracking module 215 that are monitored for non-bus related events.

Writing different control data to the control registers of performance tracking module 215 can change the performance data that is collected for those peripherals connected to performance tracking module 215 and user circuit 945. If one or more other components on the bus such as DMA 915 or Quad SPI 925 are to be connected to performance tracking module 215, and/or other user circuits, then a reconfiguration or partial reconfiguration of SOC 205 is required to connect the appropriate agents and/or non-bus related signals to performance tracking module 215.

For purposes of explanation, specific nomenclature is set forth to provide a thorough understanding of the various inventive concepts disclosed herein. The terminology used herein, however, is for the purpose of describing particular embodiments only and is not intended to be limiting. For example, reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

One or more aspects disclosed within this specification can be realized in hardware or a combination of hardware and software. One or more aspects can be realized in a centralized fashion in one system or in a distributed fashion where different elements are spread across several interconnected systems. Any kind of data processing system or other apparatus adapted for carrying out at least a portion of the methods described herein is suited.

One or more aspects further can be embedded in a device such as a computer program product, which includes all the features enabling the implementation of the methods described herein. The device can include a data storage medium, e.g., a non-transitory computer-usable or computer-readable medium, storing program code that, when loaded and executed in a system including a processor, causes the system to initiate and/or perform at least a portion of the functions or operations described within this specification. Examples of data storage media can include, but are not limited to, optical media, magnetic media, magneto-optical media, computer memory such as random access memory, a bulk storage device, e.g., hard disk, or the like.

Accordingly, the flowchart and block diagrams in the Figures illustrate the architecture, functionality, and operation of possible implementations of systems, methods and computer program products according to various embodiments of the one or more embodiments disclosed herein. In this regard, each block in the flowchart or block diagrams may represent a module, segment, or portion of code, which includes one or more executable instructions for implementing the specified logical function(s). It should also be noted that, in some alternative implementations, the functions noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terms "computer program," "software," "application," "computer-usable program code," "program code," "executable code," variants and/or combinations thereof, in the present context, mean any expression, in any language, code or notation, of a set of instructions intended to cause a data processing system to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

Thus, throughout this specification, statements utilizing terms such as "processing" or "computing" or "calculating" or "determining" or "displaying" or the like, refer to the action and processes of a data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

The corresponding structures, materials, acts, and equivalents of all means or step plus function elements in the claims below are intended to include any structure, material, or act for performing the function in combination with other claimed elements as specifically claimed.

One or more embodiments disclosed within this specification can be embodied in other forms without departing from the spirit or essential attributes thereof. Accordingly, reference should be made to the following claims, rather than to the foregoing specification, as indicating the scope of the one or more embodiments.

What is claimed is:

1. An integrated circuit comprising:
a bus;
a central processing unit coupled to the bus;
a peripheral coupled to the bus; and
a performance tracking module configured to detect bus events and non-bus related events;
wherein the performance tracking module is configured to determine a bus performance metric from the bus events and a non-bus performance metric from the non-bus related events;
wherein the performance tracking module comprises:
an event logger configured to detect a first bus event and a second bus event immediately following the first bus event, calculate a time difference between the first bus event and the second bus event, and store the time difference in lieu of a time stamp for each of the first and second bus events individually.

2. The integrated circuit of claim 1, wherein the bus performance metric is determined responsive to determining that the non-bus performance metric meets a predetermined condition.

3. The integrated circuit of claim 1, wherein the performance tracking module comprises:
an event counter configured to count occurrences of bus events and occurrences of non-bus related events.

4. The integrated circuit of claim 1, wherein the performance tracking module comprises:
control registers that are written with control data selecting the bus performance metric and the non-bus performance metric.

5. The integrated circuit of claim 1, wherein the non-bus related events are detected from user-specified circuitry of the integrated circuit connected to the performance tracking module.

6. The integrated circuit of claim 4, wherein the control registers are written by the processor.

7. The integrated circuit of claim 6, wherein the performance tracking module is coupled to an interrupt controller;
wherein the interrupt controller is configured to generate an interrupt to the processor responsive to a signal from the performance tracking module.

8. The integrated circuit of claim 7, wherein the processor writes control data to the control registers responsive to the interrupt.

9. A performance tracking module comprising:
a plurality of control registers;
an event logger coupled to the control registers and configured to detect a selected bus event from a bus and a selected non-bus related event from a circuit not connected to the bus according to the control registers; and
an event counter coupled to the control registers and configured to count occurrences of the selected bus event and the selected non-bus related event according to the control registers;
wherein the event logger comprises an event detector module configured to detect a first bus event and a second bus event immediately following the first bus event, calculate a time difference between the first bus event and the second bus event, and store the time difference in lieu of a time stamp for each of the first and second bus events individually.

10. The performance tracking module of claim 9, wherein the event logger further comprises:
a streaming first-in-first-out interface coupled to the event detector; and
a streaming first-in-first-out memory coupled to the streaming first-in-first-out interface;
wherein the streaming first-in-first-out interface receives performance data comprising the time difference from the event detector module and writes the performance data to the streaming first-in-first-out memory.

11. The performance tracking module of claim 9, wherein the event counter comprises:
a metric enable generator configured to detect bus events and non-bus related events;
a plurality of counters; and
a metric selector coupled to the metric enable generator and the plurality of counters;
wherein the metric selector passes only the selected bus event and the selected non-bus related event from the metric enable generator to the plurality of counters according to the control registers.

12. The performance tracking module of claim 9, wherein the control registers are written with control data selecting a bus performance metric to be determined from the selected bus event and a non-bus performance metric to be determined from the selected non-bus related event.

13. The performance tracking module of claim 12, wherein the non-bus performance metric is calculated responsive to calculating the bus performance metric and determining that the bus performance metric meets a predetermined condition.

14. The performance tracking module of claim 12, wherein the bus performance metric is calculated responsive to calculating the non-bus performance metric and determining that the non-bus performance metric meets a predetermined condition.

15. A method of performance tracking for a system-on-a-chip, the method comprising:
- detecting non-bus related events from a circuit implemented within an integrated circuit;
- detecting bus events from a bus coupling a processor and a peripheral both implemented within the integrated circuit;
- calculating a non-bus performance metric from the non-bus related events; and
- calculating a bus performance metric from the detected bus events wherein detecting bus events further comprises:
- detecting a first bus event and a second bus event immediately following the first bus event;
- calculating a time difference between the first bus event and the second bus event; and
- storing the time difference in lieu of a time stamp for each of the first and second bus events individually.

16. The method of claim 15, wherein either the non-bus performance metric or the bus performance metric is calculated responsive to detecting a predetermined condition.

17. The method of claim 15, further comprising:
- generating an interrupt responsive to stored performance data selected from the group consisting of the non-bus performance metric and the bus performance metric;
- wherein the processor, responsive to the interrupt, writes control data to control registers specifying further performance data to be collected.

* * * * *